July 5, 1955

W. F. JEHN 2,712,423

PLUMMET ACTUATED MECHANISM AND
PARACHUTE DELIVERY APPARATUS

Filed Sept. 29, 1954

INVENTOR.
WERNER F. JEHN
BY Lloyd B. Stevens, Jr.
Wade Koontz AND
ATTORNEYS

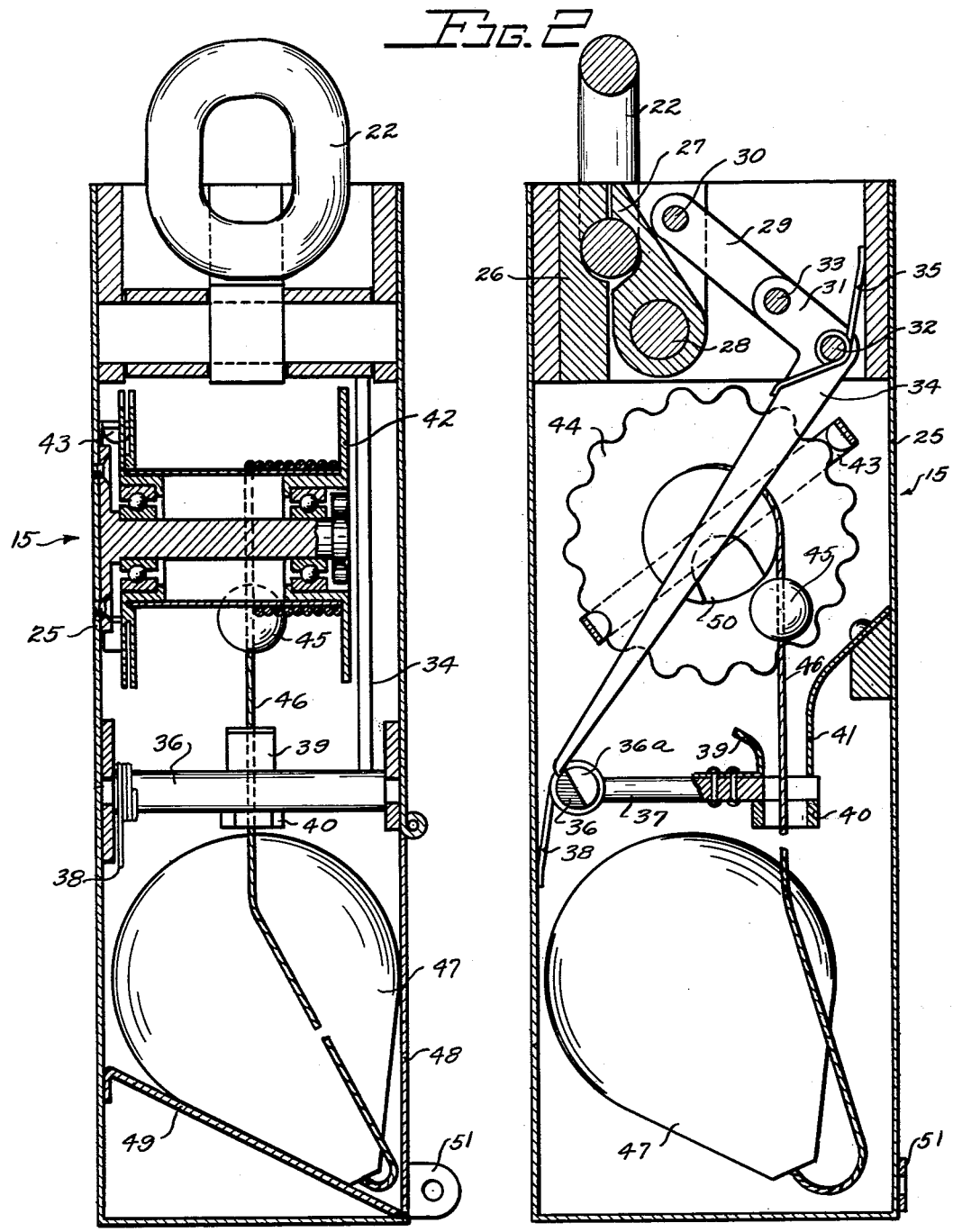

United States Patent Office 2,712,423
Patented July 5, 1955

2,712,423

PLUMMET ACTUATED MECHANISM AND PARACHUTE DELIVERY APPARATUS

Werner F. Jehn, Wright-Patterson Air Force Base, Ohio

Application September 29, 1954, Serial No. 459,222

8 Claims. (Cl. 244—150)

(Granted under Title 35, U. S. Code (1952), sec. 266)

The invention described herein may be manufactured and used by or for the United States Government for governmental purposes without payment to me of any royalty thereon.

This invention relates to a parachute cargo package and particularly to a parachute release mechanism. More particularly this invention relates to a mechanism for releasing or actuating an apparatus, e. g. a parachute, at a selected distance above the earth surface.

A number of different types of apparatus for releasing a parachute at a selected distance above the earth surface are known, e. g. bellows means, and some of these apparatus are actuated by a plummet extending from the apparatus and supported by a line. Most of these apparatus are quite complex, some of them using electrical and/or explosive means in conjunction with mechanical means to accomplish the parachute release. At least one of the apparatus has a plummet actuating means wherein the plummet is lowered from the airplane until it is suspended by the entire length of its line before the line is attached to the parachute package.

Broadly my invention involves a release or actuating mechanism which will automatically operate when it reaches a certain preset distance above the earth surface. The primary actuating means of my invention is a plummet on a line. This plummet operates in conjunction with a drum, lever, spring arrangements, etc., and may operate with a pilot parachute to release a main parachute at a certain distance above the earth surface. This invention also includes the release mechanism incorporated in a parachute cargo package.

It is an object of this invention to provide a parachute cargo apparatus which does not drift to any extent in its descent and which falls rapidly during the major portion of its descent to aid in avoiding anti-aircraft fire.

Another object of this invention is to provide a parachute release mechanism for use on personnel parachutes wherein the main parachute will open at a preselected distance above the earth surface with the result that the individuals using these parachutes will fall rapidly during most of the descent to land without substantial drift and to avoid anti-aircraft fire.

It is a further object of this invention to provide an automatic actuating mechanism for actuating or releasing any type of apparatus at a preset distance above the surface of the ground.

It is still another object of this invention to provide an automatic parachute release mechanism which is simple in construction and foolproof in operation.

An additional object of my invention is to provide an apparatus for releasing a parachute at a fixed distance above the ground regardless of the altitude of the terrain.

It is a particular object of this invention to provide an automatic release mechanism which is usable on parachutes and which contains a plummet on a line as the primary actuating mechanism, the plummet being associated with a drum, levers, springs, a pilot parachute, etc., to give a positive release of the main parachute at a preset distance above the surface of the earth.

These and other objects of my invention will be apparent from the following detailed description of the invention and the claims, taken in conjunction with the accompanying drawings showing a preferred embodiment of my invention.

Fig. 2 is a front elevational view in partial section of my automatic release mechanism.

Fig. 3 is a side elevational view in partial section of my automatic release mechanism.

Figure 1:
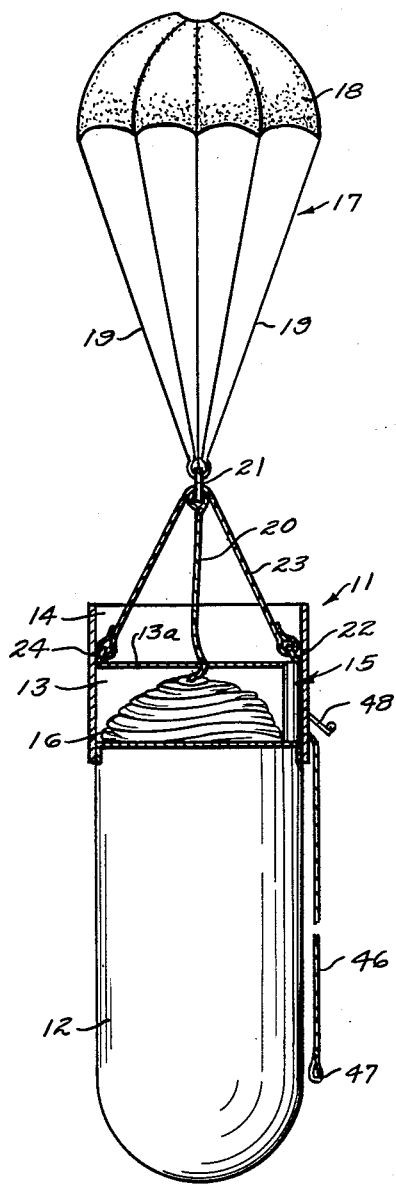
Fig. 1 is an elevational view in partial section of a parachute cargo package incorporating my release mechanism.

Fig. 1 shows the complete parachute cargo package. This parachute cargo package 11 includes a cargo compartment 12, a main parachute compartment 13, a pilot parachute compartment 14, my release mechanism 15, a main parachute 16, and a pilot parachute 17. Parachute cargo package 11 may be fabricated as a single unit, preferably of metal such as steel. However, it may be desirable to use a light metal such as aluminum. Alternatively package 11 may be made by joining the cargo compartment to the parachute compartments by welding or other suitable means. The pilot parachute compartment is separated from the main parachute compartment by removable divider 13a. The pilot parachute is shown in an inflated condition with its canopy 18 and parachute lines 19. The parachute lines 19 of pilot parachute 17 are joined at their ends not attached to canopy 18 to ring 21. Also attached to ring 21 by line 20 is the canopy of main parachute 16. Main parachute 16 is rigidly attached to parachute cargo package 11 by conventional parachute lines. A cord 23 is attached to parachute cargo package 11 at point 24, passes through ring 21, and is attached to link 22. Link 22 is shown attached to parachute release mechanism 15. In Fig. 1 certain other features which will be described in greater detail in the other figures are also shown. These are door 48, which is hinged to release mechanism 15, cable 46, and plummet 47, which is attached to the free end of cable 46.

Details of my release mechanism 15 are shown in Figs. 2 and 3. The base for my release mechanism is frame 25, which is rigidly attached to parachute cargo package 11 by welding or other suitable means. Jaw 26 is rigidly attached to the frame 25 by welding or other suitable means, and movable jaw 27 is rotatably attached by pin 28 to frame 25. Jaws 26 and 27 are capable of cooperation to retain link 22. Arm 29 is rotatably attached by pin 30 to movable jaw 27 near its free-end. Arm 31 is rotatably attached by pin 32 to frame 25. Arms 29 and 31 are joined by pin 33 to form a toggle-type linkage. Spring 35 is associated with arm 34 in such a fashion that it tends to rotate arm 31 in a counterclockwise direction and cause the toggle linkage to break. Shaft 36 is rotatably attached to frame 25. Lever 34 is rigidly attached by welding or other suitable means to arm 31, and the free-end of lever 34 is associated with shaft 36 which has a milled-out portion 36a closely associated with the free-end of lever 34. Lever 37 is rigidly attached by welding or other suitable means to shaft 36, and spring 38 is so associated with shaft 36 that it tends to cause shaft 36 to rotate in a counterclockwise direction. Lever 37 has a forked-type free-end and a curved shoulder 39 located near the free-end. The forked free-end of lever 37 rests on sleeve 40, which is attached to frame 25 by welding or other suitable means, prior to the actuation of the mechanism. Spring 41 is attached at one end by a screw to a block, which may be welded to frame 25. The other end of spring 41 holds lever 37 against sleeve 40 until the initial actuation of the apparatus occurs.

Drum 42 is rotatably attached to frame 25, and cable 46 is wound around drum 42 before the initial actuation of the mechanism. One end of cable 46 may or may not be attached to drum 42 as desired. Ball 45 is rigidly attached to cable 46 at or near the end of cable 46, which may be attached to drum 42. When cable 46 is wound on drum 42 ball 45 fits in a notch 50 provided therefor in drum 42. Drum 42 is restricted in its speed of rotation by sliding detent 43 which operates in conjunction with a notched portion 44 which is similar to a gear in appearance and is located on one end of drum 42. This sliding detent is so attached to frame 25 that it is movable in both directions parallel to its longitudinal axis. It cooperates with notched portion 44 which consists of an odd number of notches to substantially restrict the speed of rotation of drum 42 when cable 46 is being unwound. Cable 46 may be made of nylon, metal, or other suitable material. Cable 46, after its point of attachment to ball 45, passes through the forked portion of lever 37 and through sleeve 40. The free-end of cable 46 is then attached to plummet 47. Before initial activation of the apparatus, plummet 47 rests on incline 49 which is rigidly attached by welding or other suitable means to frame 25, and plummet 47 is held in this position by door 48 which is hinged to frame 25 and locked closed by catch 51 when the apparatus is not in use.

My release mechanism operates in the following manner. When it is desired to launch parachute cargo package 11 from the airplane catch 51 locking door 48 closed is released. This catch may be closed by a pin which is attached to the airplane, so it will be automatically released when the cargo package is dropped. The package is then launched and at the same time pilot parachute 17 is released. Suitably the ripcord of the pilot parachute may be attached to the airplane, so the pilot parachute will be automatically released when the cargo package is dropped. Parachute cargo package 11 is then suspended from pilot parachute 17 as shown in Fig. 1. Plummet 47 slides down incline 49, pushing open door 48, and cable 46 slowly unwinds from drum 42 due to the weight of plummet 47. The speed of unwinding of cable 46 is restricted by detent 43 operating in cooperation with notched portion 44 of drum 42. Plummet 47 tends to fall at a more rapid rate than parachute cargo package 11 which is restricted in its descent by pilot parachute 17. When nearly all of cable 46 is unwound from drum 42, ball 45 is pulled from slot 50 and contacts curved shoulder 39 and spring 41. Thereby, spring 41 is pushed to the side so it no longer restricts the rotation of lever 37. However, lever 37 is now restricted in its rotation by ball 45 which is held against lever 37 by the weight of plummet 47 and cable 46.

When plummet 47 contacts matter having substantial resistance to penetration on impact, e. g. water, the ground, or other solid objects, in its descent, the tension on cable 46 is very substantially reduced and ball 45 no longer bears down with any substantial force against lever 37. At this time spring 38 rotates lever 37 in a counterclockwise direction, and milled-out portion 36a of shaft 36 is rotated into association with the free-end of lever 34. Lever 34 is now caused to rotate in a counterclockwise direction by spring 35 and lever 31 is rotated with it causing the toggle linkage to break and movable jaw 27 to be rotated in a clockwise direction. The separation of movable jaw 27 from jaw 26 releases link 22, and cord 23 and link 22 feed through ring 21 to release pilot parachute 17 from cargo package 11. As pilot parachute 17 separates from parachute cargo package 11 line 20 pulls the canopy of main parachute 16 and removable divider 13a from the parachute cargo package, and main parachute 16 opens and supports parachute cargo package 11 during the balance of its descent.

It is obvious that certain changes and modifications may be resorted to from time to time by persons skilled in the art without departing from the spirit of the invention or the scope of the appended claims.

I claim:
1. An automatic actuating mechanism designed to operate at a preset distance above the surface of the earth comprising a frame, a jaw rigidly attached to said frame, a movable jaw rotatably attached to said frame, said jaw and said movable jaw being capable of cooperation to retain a link, a first arm rotatably attached to said movable jaw, a second arm rotatably attached to said frame, said first arm being rotatably attached to said second arm to form a toggle-type linkage, a first spring so associated with said second arm as to tend to cause said arm to rotate, a first lever attached to said second arm in such a manner that it rotates with said second arm, a shaft rotatably attached to said frame and having a milled-out portion, the free-end of said first lever being so associated with said shaft that said first lever is restricted in its movement by said shaft except when the free-end of said first lever is associated with the milled-out portion of said shaft, a second spring associated with said shaft in such a manner that said shaft tends to rotate, a second lever attached to said shaft in such a manner that it rotates with said shaft, said second lever having a shoulder located near its free-end, a sleeve attached to said frame, a spring arm attached to said frame at one end and the other end of which holds the free-end of said second lever against said sleeve, a drum rotatably attached to said frame, means to restrict the speed of rotation of said drum, a cable wound around said drum, a sphere attached to said cable, said cable passing through said sleeve, a plummet attached to the free-end of said cable, means to hold said plummet in close association with said frame until the mechanism is used, said sphere cooperating when said cable is unwound from said drum with the shoulder of said second lever to remove said spring arm from holding the free-end of said second lever against said sleeve, and said sphere holding the free-end of the second lever against said sleeve until the tension of said cable is substantially reduced by said plummet contacting matter having substantial resistance to penetration on impact.

2. The mechanism of claim 1 wherein an incline supports said plummet within said frame and a hinged door holds said plummet within said frame except when the catch on said door has been released.

3. The mechanism of claim 1 wherein one end of said drum is notched in the nature of a gear having odd number of teeth, a sliding detent is attached to said frame, said detent cooperating with the notched portion of said drum to act as a brake on the speed of rotation of said drum.

4. The mechanism of claim 1 wherein said sphere is retained in a recess in said drum when said mechanism is not in use.

5. A parachute release mechanism comprising a frame, a jaw rigidly attached to said frame, a movable jaw rotatably attached to said frame, said jaw and said movable jaw being capable of cooperation to retain a link, a first arm rotatably attached to said movable jaw, a second arm rotatably attached to said frame, said first arm being rotatably attached to said second arm to form a toggle-type linkage, a first spring so associated with said toggle-type linkage as to tend to cause said linkage to break, a first lever attached to said second arm in such a manner that it rotates with said second arm, a shaft rotatably attached to said frame and having a milled-out portion, the free-end of said first lever being so associated with said shaft that said first lever is restricted in its movement by said shaft except when the free-end of said first lever is associated with the milled-out portion of said shaft, a second spring associated with said shaft in such a manner that it tends to rotate said shaft, a second lever attached to said shaft in such a manner that it rotates with said shaft, said second lever having a forked free-end, a curved shoulder located near its free-end, a sleeve attached to said frame, a spring arm attached to said frame at one end and the other end of which holds the free-end of said second lever against said sleeve, a drum rotatably attached to said frame, one end of said drum being notched in the nature of a gear having an odd number of teeth, a sliding detent attached to said frame, said detent cooperating with the notched portion of said drum to act as a brake on the speed of rotation of said drum, a cable wound around said drum, a sphere attached to said cable, said sphere being retained in a recess in said drum when said mechanism is not in use, said cable passing through said sleeve, a plummet attached to the free-end of said cable, an incline attached to said frame and supporting said plummet, a hinged door holding said plummet within said frame except when the catch on said door has been released, said sphere cooperating when said cable is unwound from said drum with the curved shoulder of second lever to remove said spring arm from holding the free-end of said second lever against said sleeve, and said sphere holding the free-end of said second lever against said sleeve until the tension of said cable is substantially reduced by said plummet contacting matter having substantial resistance to penetration on impact.

6. In a parachute cargo package having a cargo compartment, a main parachute compartment, a pilot parachute compartment, a parachute release mechanism, said parachute release mechanism comprising a frame, a jaw rigidly attached to said frame, a movable jaw rotatably attached to said frame, said jaw and said movable jaw being capable of cooperation to retain a link, a first arm rotatably connected to said movable jaw, a second arm rotatably connected to said frame, said first arm being rotatably connected to said second arm to form toggle-type linkage, a first spring so associated with said second arm as to tend to cause said arm to rotate, a first lever attached to said second arm in such a manner that it rotates with said second arm, a shaft rotatably attached to said frame and having a milled-out portion, the free-end of said first lever being so associated with said shaft that said first lever is restricted in its movement by said shaft except when the free-end of said first lever is associated with the milled-out portion of said shaft, a second spring associated with said shaft in such a manner that said shaft tends to rotate, a second lever attached to said shaft in such a manner that it rotates with said shaft, said second lever having a shoulder located near its free-end, a sleeve attached to said frame, a spring arm attached to said frame at one end and the other end of which holds said second lever against said sleeve, a drum rotatably attached to said frame, means to restrict the speed of rotation of said drum, a cable wound around said drum, a sphere attached to said cable, said cable passing through said sleeve, a plummet attached to the free-end of said cable, means to hold said plummet in close association with said frame until the mechanism is used, said sphere cooperating when said cable is unwound from said drum with the shoulder of said second lever to remove said spring arm from holding the free-end of said second lever against said sleeve, and said sphere holding the free-end of the second arm against said sleeve until the tension of said cable is substantaily reduced by said plummet contacting matter having substantial resistance to penetration on contact.

7. In a parachute cargo package having cargo compartment, a main parachute compartment, a pilot parachute compartment, a parachute release mechanism, said parachute release mechanism comprising a frame, a jaw rigidly attached to said frame, a movable jaw rotatably attached to said frame, said jaw and said movable jaw being capable of cooperation to retain a link, a first arm rotatably connected to said movable jaw, a second arm rotatably connected to said frame, said first arm being rotatably connected to said second arm to form a toggle-type linkage, a first spring so associated with said toggle-type linkage as to tend to cause said linkage to break, a first lever attached to said second arm in such a manner that it rotates with said second arm, a shaft rotatably attached to said frame and having a milled-out portion, the free-end of said first lever being so associated with said shaft that said first lever is restricted in its movement by said shaft except when the free-end of said first lever is associated with the milled-out portion of said shaft, a second spring associated with said shaft in such a manner that said shaft tends to rotate, a second lever attached to said shaft in such a manner that it rotates with said shaft, said second lever having forked free-end and a curved shoulder located near its free-end, a sleeve attached to said frame, a spring arm attached to said frame at one end and the other end of which holds the free-end of said second lever against said sleeve, a drum rotatably attached to said frame, one end of said drum being notched in the nature of a gear having an odd number of teeth, a sliding detent attached to said frame, said detent cooperating with the notched portion of said drum to act as a brake on the speed of rotation of said drum, a cable wound around said drum, a sphere attached to said cable, said sphere being retained in a recess in said drum when said mechanism is not in use, said cable passing through said sleeve, a plummet attached to the free-end of said cable, an incline attached to said frame and supporting said plummet, a hinged door holding said plummet within said frame except when the catch on said door has been released, said sphere cooperating when said cable is unwound from said drum with the curved shoulder of said second lever to remove said spring arm from holding the free-end of said second lever against said sleeve, and said sphere holding the free-end of said second lever against said sleeve until the tension of said cable is substantially reduced by said plummet contacting matter having substantial resistance to penetration on impact.

8. The parachute release mechanism of claim 7 wherein a main parachute is contained in said main parachute compartment, a pilot parachute is contained in said pilot parachute compartment, a ring joins the free-end of the lines of said pilot parachute, a link is retained by said jaws, a cord is attached to said link, said cord passing through said ring and being attached at its other end to said package, and the canopy of said main parachute is attached to said ring.

References Cited in the file of this patent
UNITED STATES PATENTS

| | | |
|---|---|---|
| 1,709,264 | Holt | Apr. 16, 1929 |
| 2,425,309 | Ennis | Aug. 12, 1947 |
| 2,509,481 | Crise | May 30, 1950 |
| 2,584,164 | Stallan | Feb. 5, 1952 |
| 2,595,450 | Coffing | May 6, 1952 |